Dec. 25, 1956   H. F. BARDWELL ET AL   2,775,190
WIRE TWISTING MECHANISM FOR HAY BALERS
Filed Dec. 17, 1952   6 Sheets-Sheet 1
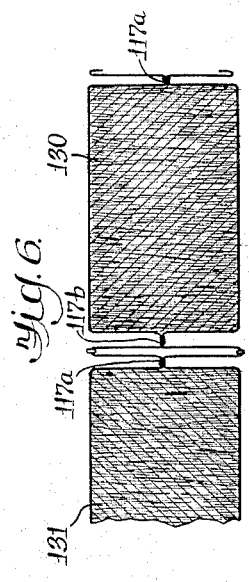
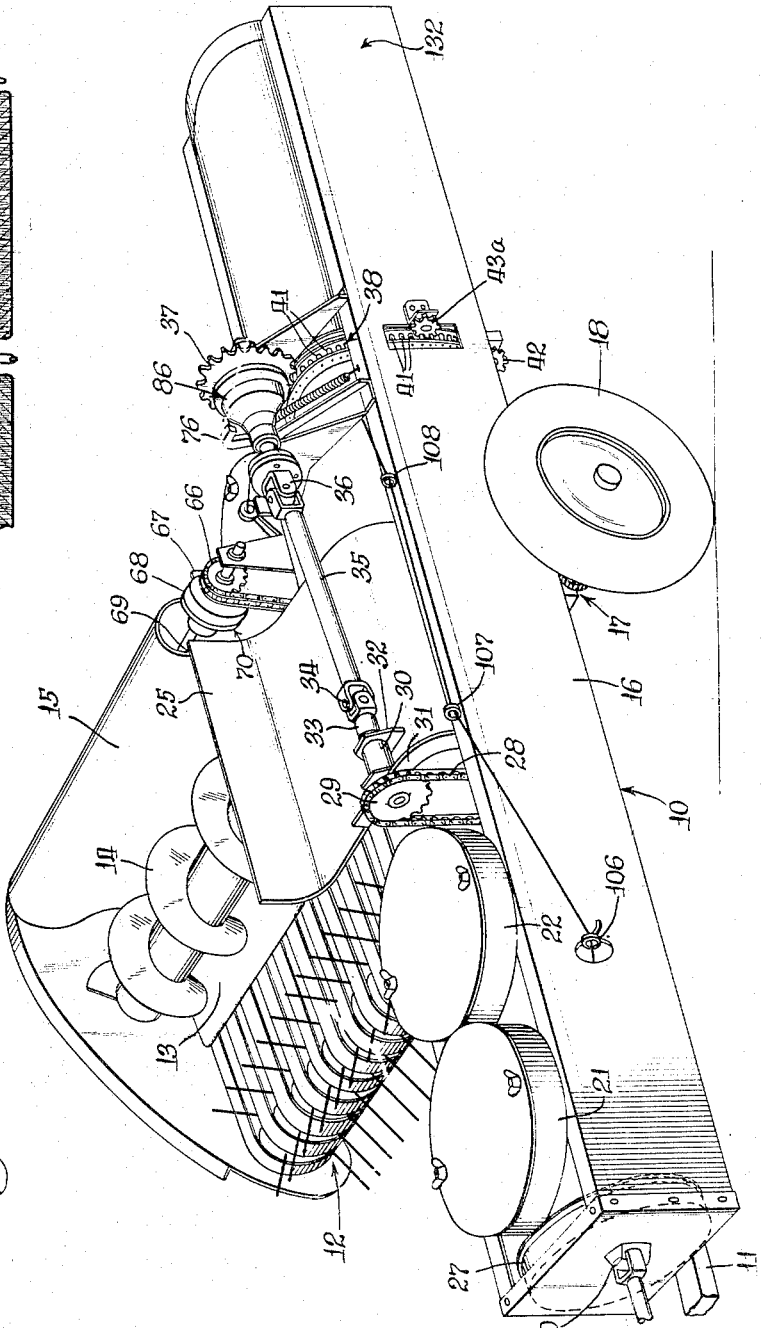
INVENTORS.
Howard H. Bardwell
Patrick L. May

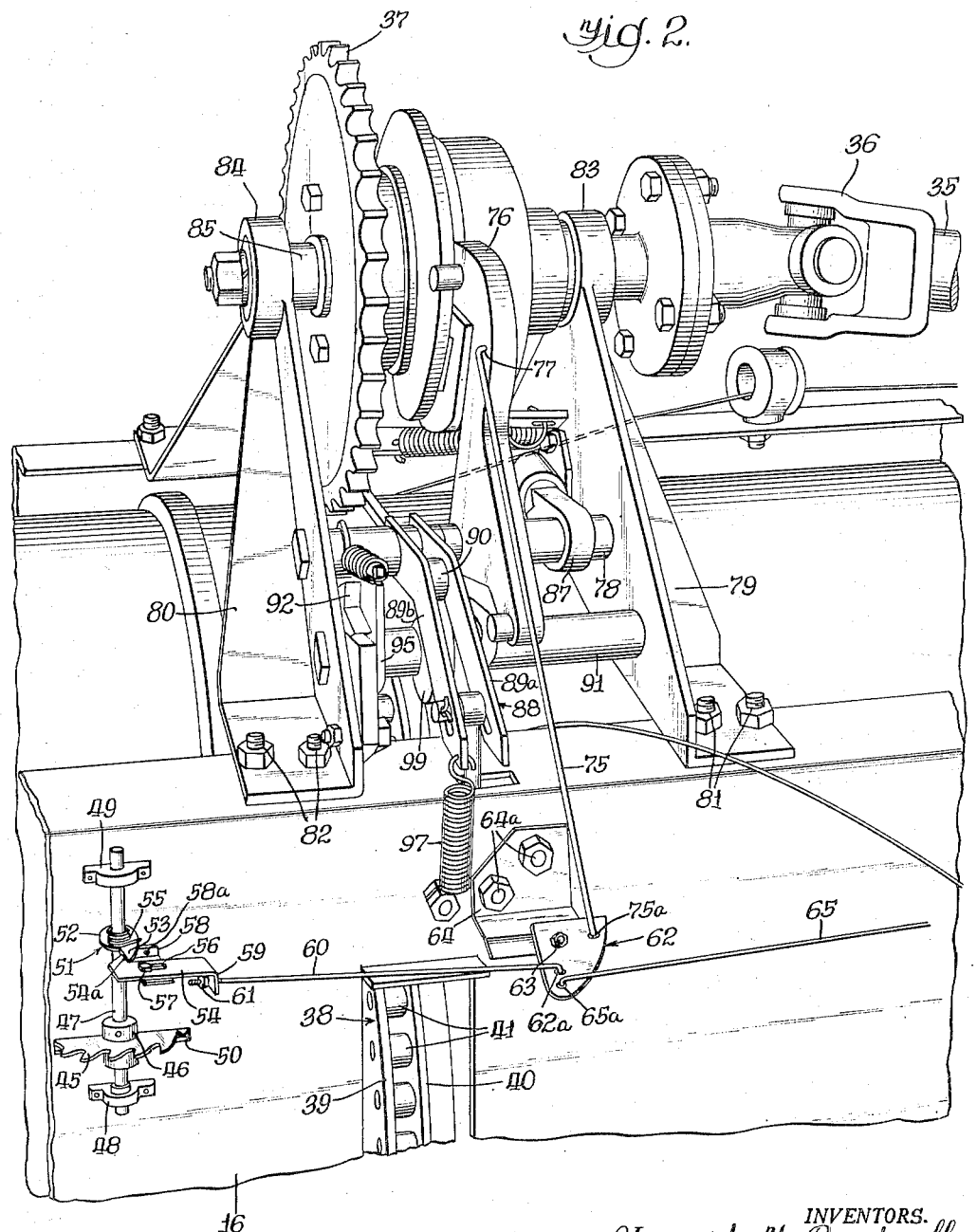

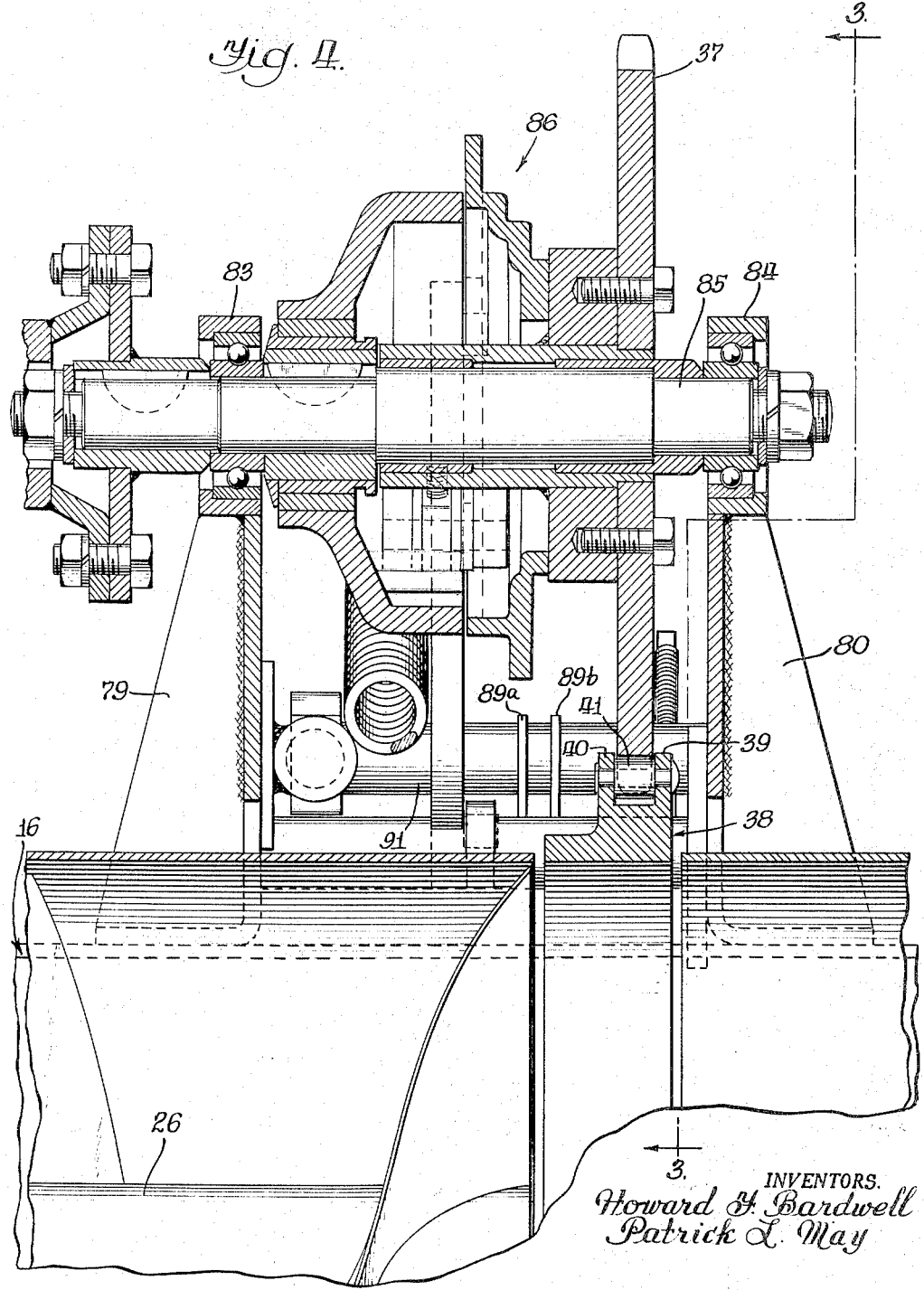

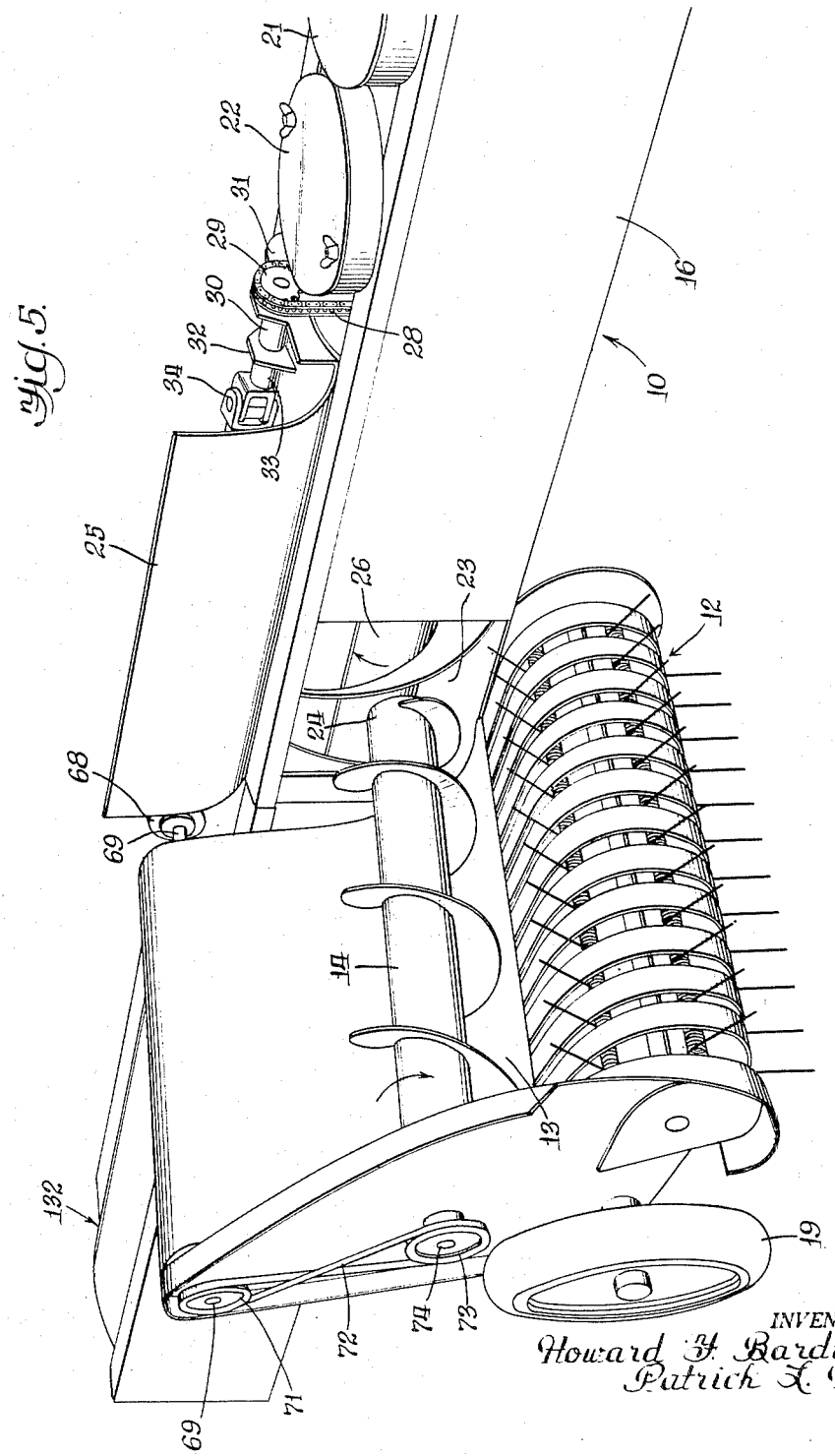

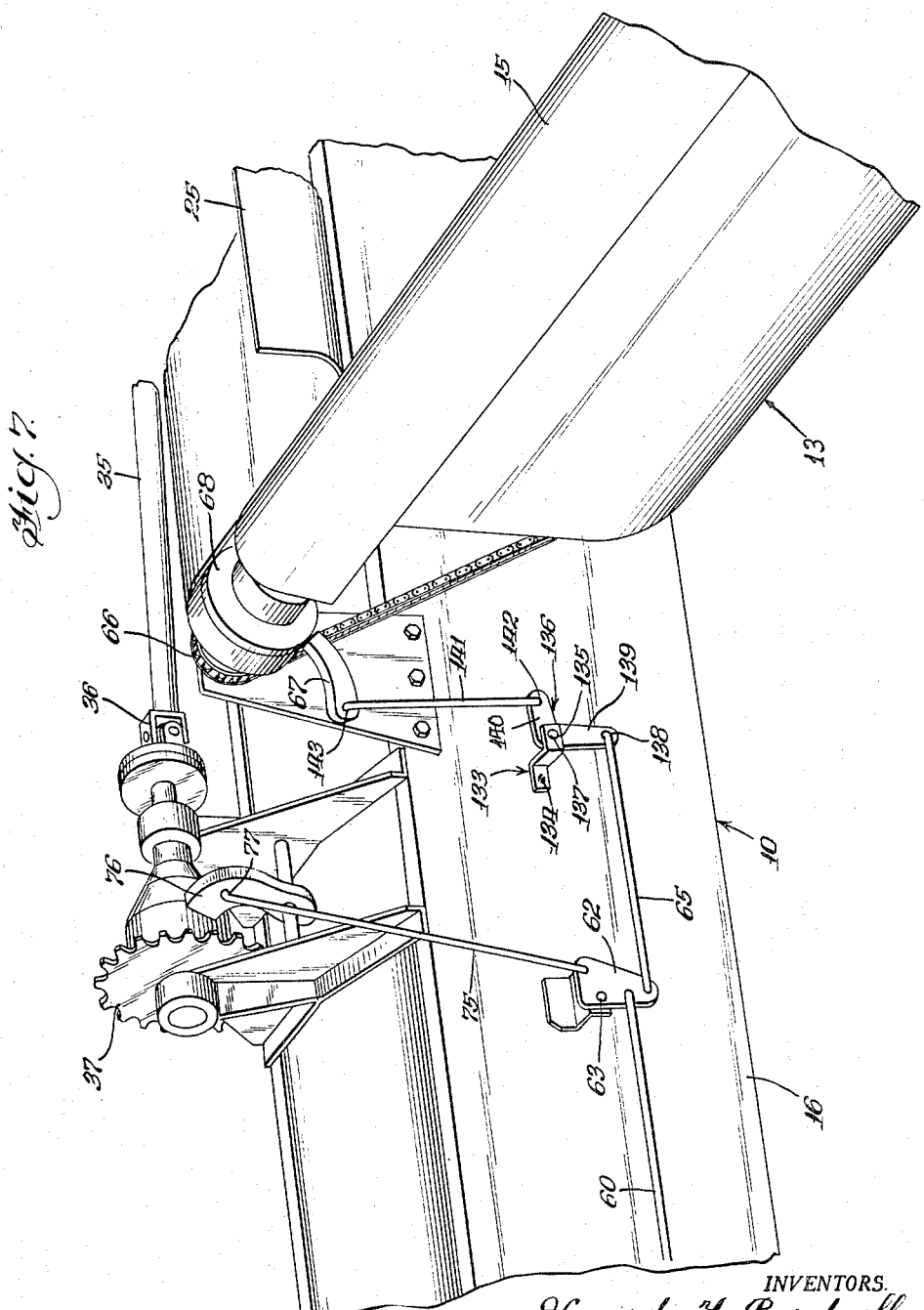

United States Patent Office

2,775,190
Patented Dec. 25, 1956

2,775,190

WIRE TWISTING MECHANISM FOR HAY BALERS

Howard F. Bardwell and Patrick L. May, Memphis, Tenn., assignors to International Harvester Company, a corporation of New Jersey Application December 17, 1952, Serial No. 326,492

13 Claims. (Cl. 100—4)

This invention relates to a new and improved wire twisting mechanism for hay and other balers.

Throughout the years there have been numerous attempts to develop a wire-twisting hay baler. Many of these attempts proved somewhat successful and there are on the market today a number of hay baling machines which incorporate various principles of wire twisting. The majority of these balers employ extremely complex methods in effecting an inter-twisting of the bale encircling wires. The problems attendant the building of a wire-twisting baler are many. Some of the more important problems include the drawing up of the wire twist to the formed bale so that the encircling strand will hold the bale relatively tightly compressed, and another important problem is concerned with getting the encircling strand around and through the bales as they are being formed.

A principal object of the present invention is therefore to provide a wire-twisting mechanism for hay and other balers which may operate continuously on a field traversing hay baler to effectively secure all of the formed bales.

An important object of this invention lies in the provision of means for a wire-twisting mechanism which encircles the entire bale forming chamber and effects a wire twisting intermediate the ends of succeeding hay bales being formed.

Another important object of this invention is to supply a bale baler with wire twisting mechanism arranged and constructed to effect a tie at both ends of a formed bale.

A still further object of this invention is to provide a hay baler having an annular wire carrying device arranged to encircle the bale forming chamber and catch up a plurality of bale encircling wires extending lengthwise of the formed bale to cause an inter-twisting of said plurality of wires at the center of the ends of the formed bales.

Another and still further important object of this invention is to supply a field traversing hay baler employing an auger compressor means in lieu of a reciprocating plunger compressor and in combination therewith a wire-twisting mechanism wherein the wire carrying element travels annularly around the bale-forming chamber adjacent the discharge end of the compressing auger whereby the formed bale has a wire twist in both ends thereof.

Still a further object of this invention is to provide a hay baler wherein the bales are compresed by a cylindrically shaped auger and are extruded through a rectangular chamber thus creating rectangularly formed hay bales.

Other and further important objects of this invention will become apparent from the disclosures in the following specification and accompanying drawings.

In the drawings:

Figure 1 is a perspective view of the hay baler incorporating the principles of this invention.

Figure 2 is an enlarged detailed perspective view of a portion of the driving mechanism for the wire twister of this invention.

Figure 4 is a sectional view taken on the line 4—4 of Figure 3.

Figure 5 is another perspective view of the hay baler of this invention as viewed from the other side thereof.

Figure 6 is a diagrammatic view of the hay bales as they are formed and wire tied with the device of this invention.

Figure 7 is a perspective view of the rear side of the baler platform and showing the portion joining the bale forming chamber.

Figure 3:
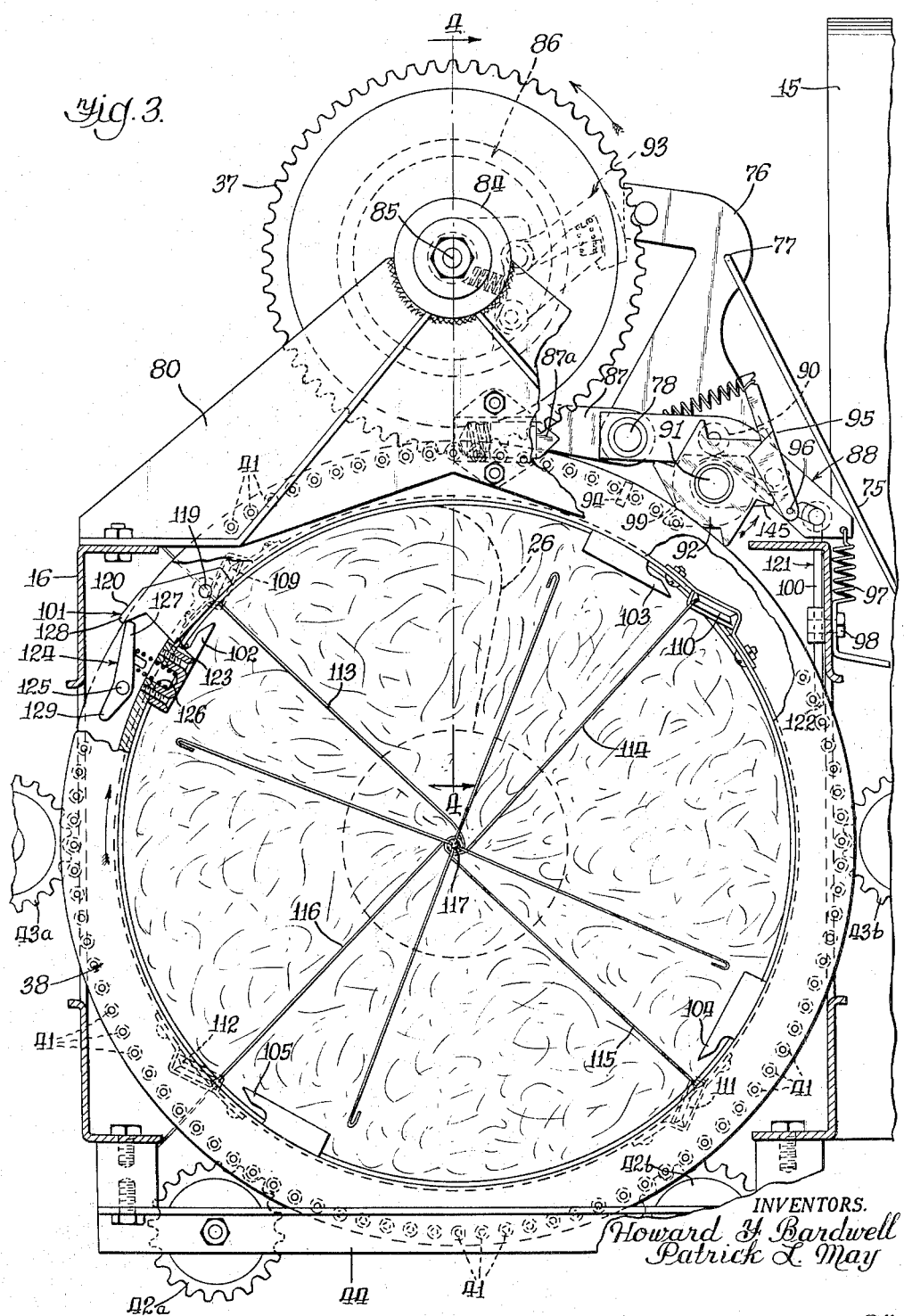
Figure 3 is a transverse sectional view taken through the bale forming chamber adjacent the wire twisting mechanism and as shown on the line 3—3 of Figure 4.

As shown in the drawings the reference numeral 10 indicates generally a field-traversing hay baler. The hay baler 10 includes a hitch mechanism 11 adapted to be attached to the draw bar of a farm tractor (not shown). A pick-up mechanism designated by the numeral 12 is adapted to pick up hay and/or other materials lying in windrows on a field and thereupon throw the material rearwardly onto a receiving platform 13 where it is delivered transversely by means of an auger conveyor 14. A back wall 15 forms the rearward enclosure of the platform 13. A longitudinally extending bale-forming chamber 16 is positioned to one side of the platform 13 and is adapted to receive hay picked up by the pick-up 12 and delivered by the auger conveyor 14 thereto. The entire hay baler 10 is mounted on a wheel truck 17 having ground engaging wheels 18 and 19 spaced on opposite sides thereof. The present machine is adapted to receive the driving power through the medium of a power take-off from the pulling tractor (not shown) and this source of power is delivered through drive shafting 20 at the forward end of the bale-forming chamber 16 whereupon it is routed to the various elements to be driven on the hay balers. As further shown in Figure 1 sources of wire supply are indicated at 21 and 22.

As best shown in Figure 5 the bale forming chamber 16 has an opening 23 on its inner side adjacent the platform 13. The opening 23 lies in the vertical wall of the chamber 16 and it is immediately adjacent the discharge end of the open end 24 of the auger 14 which is adapted to feed material transversely of the platform 13. A shield 25 in the form of a curved sheet of metal is disposed above the side opening 23 of the bale chamber 16 and aids the back-wall 15 of the platform 13 in the feeding of hay and/or straw into the bale-forming chamber 16. In addition to being able to view the side opening 23 in Figure 5, there is also visible the auger 26 within the chamber 16 which acts to compress the bales made by this machine. The auger 26 lies longitudinally of the baler and is disposed within the bale-forming chamber 16. The auger conveyors 14 and 26 are disposed perpendicularly to one another and as the hay and straw is fed transversely by the auger 14 it is delivered through the side opening 23 into the side of the compressing auger 26. The compressing auger 26 is caused to be rotated by reason of the driving rotation of the power-take-off from the tractor through the drive shafting 20. The complete driving details have not been shown inasmuch as they are not a direct part of the present invention. However, as shown in Figure 1 the power-shafting 20 drives the fly wheel 27 located transversely within the longitudinally extending baleforming chamber 16. From there the drive is delivered directly to the compressing auger 26. A chain 28 is adapted to carry drive from the auger upwardly to a sprocket 29 disposed above the bale-forming chamber 16 and mounted on a shaft 30 journaled within spaced brackets 31 and 32. The drive from there is carried rearwardly of the machine through a drive-shaft 33, a universal joint 34, a second aligned drive shaft 35, another universal joint 36 and thence to a relatively large driving sprocket 37. As best shown in Figure 3 the enlarged sprocket 37 is disposed centrally of and directly above the bale-forming chamber 16. The sprocket 37 engages a relatively large annular member called a wire twisting ring 38. The wire twisting ring 38 is shown in detail in Figures 2 and 3 and includes spaced ring members 39 and 40 and intermediately disposed rods 41 which are regularly spaced around the full annular periphery of the spaced rings 39 and 40. The rods 41 act as the teeth of the wire twisting ring 38 for direct engagement with and by the sprocket 37. The wire twisting ring is mounted for rotation on spaced guiding idler gears or sprockets 42a and 42b which are carried on a cross frame member 44. Additional spaced guiding idler gears or sprockets 43a and 43b are positioned at opposite sides of the bale-forming chamber 16 and considerably above the guiding sprockets 42a and 42b to cradle the wire twisting ring 38. The ring 38 is positioned intermediate the ends of the elongated chamber 16 and transversely around the chamber. The chamber at the location of the ring 38 is provided with an annular opening whereby the ring may engage and effect a twisting of the tie wires within the bale chamber as hereinafter explained.

The auger 26 compresses the hay or straw forcing it rearwardly through the bale-forming chamber 16. As best shown in Figure 2 there is a bale length metering wheel 45. The metering wheel 45 is what might be termed a star wheel with radially extending saw teeth adapted to engage the hay and/or straw as it passes longitudinally through the bale-forming chamber 16. The wheel 45 is mounted on and integrally with a hub 46 which is fastened to a vertically disposed shaft 47. The shaft 47 is journaled in vertically spaced apart pillow block bearings 48 and 49 disposed on one of the vertical side walls of the bale-forming chamber 16. The star metering wheel passes inwardly through the wall of the bale-forming chamber through a rectangular aperture 50 so that it might have engagement with the hay being compressed to signal that the desired length of bale has been completed and to actuate the wire twisting mechanism. The vertical shaft 47 in addition to carrying the star wheel 45 which meters the length of the bale being formed also has mounted thereon and spaced above the star metering wheel a trip finger 51. The trip finger 51 is in the form of a rotor 52 having a radially extending finger 53 which is adapted to engage and move longitudinally of the bale-forming chamber 16 a bell crank trip rod plate 54. A spring 55 is arranged and constructed intermediate the metering wheel trip finger 51 and the vertical shaft 47 whereby the trip finger may be rotated by the spring 55 and clear the bell crank trip rod plate 54 to avoid a double trip. The metering wheel 45 is mounted on the bale chamber to the rear of the twisting ring 38. It should be noted that the bell crank trip rod plate 54 has a laterally extending finger or projection 54a which lies in the same plane as the finger 53 of the metering wheel trip finger 51. The bell crank trip rod plate is also provided with an elongated aperture 56 which is engaged by a pin or the like 57 which is in turn fixedly carried on the bell crank trip rod plate support 58. The support 58 is riveted or otherwise fastened as shown at 58a to the side wall of the bale-forming chamber 16. The far end of the bell crank trip rod plate 54 opposite the laterally extending projection 54a is bent forming a downwardly turned flange 59 to which is fastened a rod 60 as shown at 61. The rod 60 may be termed a bell crank trip rod inasmuch as it engages a bell crank lever 62 at 62a to effect angular movement thereof. The bell crank 62 is pivotally mounted at 63 on a bracket 64 which is mounted on the side wall of the bale-forming chamber 16 by means of bolts or the like 64a. The bell crank 62 is engaged by another connecting rod 65 as shown at 65a and rotation of the bell crank 62 about its pivot 63 causes the rod to be pulled in an endwise direction.

The perspective view of Figure 2 is viewed from the platform side of the hay baler and thus the star metering wheel 45 and its adjacent operating parts is disposed on the inner wheel of the bale forming member 16 toward the rearward discharge portion of that bale chamber and spaced rearwardly of the discharge end of the compressing auger disposed within the bale forming chamber. As best shown in Figure 1 part of the cross conveyor platform 13 has been broken out at the upper portion of the back 15 thereof in order to show the utilization of a conventional trip dog and bell housing clutch all mounted on the cross conveyor drive shaft. This assembly of elements includes a cross conveyor drive sprocket 66, a cross conveyor trip lever 67, a cross conveyor bell housing 68, a cross conveyor drive shaft 69, and a cross conveyor trip dog cam member 70. The drive shaft 69 extends across the rearward portion of the platform 13 through the back wall 15 thereof and as best shown in Figure 5 projects laterally of the platform on the far side and carries a V-belt pulley 71. A V-belt 72 engages the pulley 71 and projects downwardly and forwardly in a crossed manner for engagement with a V-belt pulley 73 which is in turn affixed to a shaft 74 constituting the drive shaft for the open ended cross conveyor auger 14. As previously stated the auger 14 is positioned on the platform 13 and is adapted to convey hay and straw, picked up by the pick-up 12, laterally of the platform and thence into the bale-forming chamber 16 through the side opening 23. The rod 65 is adapted to engage the cross conveyor trip lever 67 and by reason thereof the drive to the cross running auger conveyor 14 is temporarily discontinued during the tying or twisting of the bale encircling wires. The connection of the rod 65 with the trip lever 67 is best shown in Figure 7. A bracket 133 is attached by welding or the like to the bale chamber 16 at 134. An outwardly spaced portion 135 of the bracket 133 hingedly receives a bell-crank lever 136 at 137. The rod 65 is pivotally attached at 138 to a downwardly depending arm 139 of the bell-crank 136. A spaced apart arm 140 on the bell-crank lever pivotally receives the end of a generally vertically disposed rod 141 at 142. The rod 141 extends upwardly to a pivotal attachment at 143 on the trip lever 67.

A second control rod 75 is also affixed to the bell crank 62 at 75a spaced from the rod attachments at 62a and 65a. The rod 75 is given endwise movement by rotation of the bell crank lever 62. The details of the connecting rod 75 from the bell crank lever 62 are best shown in Figures 2 and 3 wherein the rod extends upwardly and inwardly for engagement with a trip lever 76 at 77. The trip lever 76 is carried on a transversely disposed shaft 78 mounted in spaced-apart frame members 79 and 80 which are in turn carried on the top of the bale-forming chamber 16 by means of bolts 81 and 82 respectively. The upper ends of the spaced brackets 79 and 80 are provided with aligned bearings 83 and 84 adapted to journally receive a shaft structure 85 which carries the enlarged sprocket 37. The shaft structure 85 joins with the universal joint 36 to receive rotational drive from the shaft 35. A clutch 86 is mounted on the structure 85 and has its one side thereof adjacent the joint 36 continuously driven. The other side of the clutch 86 is joined to the sprocket 37 and causes an intermittent rotation thereof whenever wire intertwisting is desired.

The cross shaft 78 in addition to carrying the trip lever 76 also carries a trip lever ratchet 87 which engages a spring extended projection 87a to index and hold the shaft in either of two angular positions, and a wire shear trip arm 88. As best shown in Figure 2 the trip arm includes spaced side arms 89a and 89b between which is journally carried a trip arm roller 90. A second shaft 91 lies parallel to the shaft 78 and in the same manner as shaft 78 is journaled in the spaced brackets 79 and 80. The shaft 91 is adapted to carry a star wheel 92 which is best shown in Figure 3. When the metering wheel 45 causes the bell crank lever 62 to be rotated about its hinged mounting, the rod 75 attached to the bell crank lever pulls on the trip lever member 76 causing it to become disengaged from a holding position of the clutch 86 and the trip dog assembly designated by the numeral 93 thus permits the sprocket 37 to rotate and as the sprocket rotates so does the wire twisting ring member 38. The number of rotations of the wire twisting ring is controlled by the star wheel 92. A lug 94 on the wire twisting ring 38 advances the star wheel 92 one notch for each rotation thereof. The star wheel 92 is prevented from turning backwards by the star wheel pawl 95. The pawl 95 is hingedly mounted at 96 on the wire shear trip arm 88. The wire shear trip arm 88 is normally urged downwardly by reason of a spring 97 which is fixedly anchored at 98 on the side wall of the bale-forming chamber 16. It should be noted that the details of the trip dog assembly 93 have not been disclosed here in great detail for the reason that they form no direct part of the present invention and are more adequately shown and described in the copending application of J. H. Bornzin, et al. now matured into Patent 2,634,840. When the wire twisting ring 38 has made five revolutions the star wheel 92 has been turned to a position bringing the heel of a wire shear trip cam 99 toward the wire shear trip arm 88. The spring 97 pulls the wire shear trip arm 88 downwardly and an associated shear trip 100 is moved to a position to actuate the wire shears 101 which are hingedly mounted on the wire twister ring 38.

As best shown in Figure 3, four wire hooks 102, 103, 104 and 105 are fixedly mounted to and extend radially inwardly of the wire twisting ring 38. The wire hooks are adapted to engage a plurality of wires coming from the containers 21 and 22 on one side of the baler and from further containers (not shown) through wire guide elements 106, 107 and 108 such as shown in Figure 1 and leading to wire guiding sheaves 109, 110, 111 and 112 mounted for individual rotation on the bale forming chamber in close proximity to the wire twisting ring 38. As the wire twisting ring 38 rotates by reason of the actuation of the clutch 86 causing rotation of the sprocket 37 the wires designated by the numerals 113, 114, 115 and 116 enter the bale-forming chamber 16 over the guide sheaves 109, 110, 111 and 112 respectively whereby continued rotation of the wire twisting ring 38 draws the four wires across the forward end of a newly formed bale where they twist around each other forming a secure fastening twist indicated generally at 117. The twist 117 is formed in the wires in spaced apart portions 117a and 117b on each side of the twister ring 38 at the rear end of the auger 26. This twist 117 also joins the wires to receive and hold the next bale of hay or straw as best shown in Figure 6 where the wire twists and the formation of the bales are illustrated diagrammatically.

A wire shear 101 is shown hingedly mounted at 119 on the annular wire twister ring 38 just forward of the hook 102. Similar wire shears (not shown) are positioned adjacent each of the hooks 103, 104, and 105. The wire shears 101 are so shaped that their outer edges 120 normally extend beyond the outer periphery of the annular member 38. The shear trip mechanism 100 is mounted on the frame structure of the bale-forming chamber 16 as previously described. The lower end 122 of the wire shear trip 100 projects downwardly into the path of the wire shear members 101 and more particularly into the path of the outer edges 120 thereof whereby when the annular member 38 passes the shear trip 100 the wire shears 101 will be caused to swing arcuately about their hinges 119 and effect a successive cutting of the bale encircling wires in the manner indicated in Figures 3 and 6. As best shown in Figure 3 the wire shears 101 have a lower cutting edge 123 which is adapted to pass across the wire hooks 102, 103, 104, and 105 and cause a successive severing of the wires carried thereby. Shear openers 124 are hingedly mounted at 125 on the annular ring member 38 closely to the rear of the wire shears 101. Springs 126 are arranged and constructed to urge the relatively long end portions 127 of the shear openers 24 radially outwardly in such a manner that they engage the underside of lips 128 formed on the outer portions 120 of the wire shears 101. The openers insure that the wire shears 101 will be in open position spaced from the bale encircling wires at all times other than when the wire shear trip 100 causes the wire shears 101 to be swung downwardly about their hinges 119 against the action of the springs 126 normally tending to maintain the wire shears 101 in open position. Immediately following the shearing of the several wires the wire shears 101 are positively swung outwardly from wire cutting position by reason of the wire shear trip 100 engaging the short end portions 129 of the shear openers 124. When the wire shears 101 are tripped and moved radially inwardly the outer end portions 129 of the shear openers 124 are swung radially outwardly whereupon the ends 129 are moved into the path of the wire shear trip end 122 in such a manner that immediately after the wire shears 101 are moved into cutting position they are forcibly withdrawn from such cutting position by the passing of the shear openers by the shear trip 100. It is obvious that the springs 126 would normally be sufficient to cause the wire shears to be raised outwardly of the annular ring 38 but in the cutting of baling wires it is desirable to provide positive lever means for effecting the raising of the wire shears in addition to the urging of the springs 126.

When a complete revolution of the wire twisting ring is made all the four wires have been cut. As best shown in Figure 3 as the star wheel 92 is advanced the next notch a trip finger 145 actuates to push upwardly on the trip lever 76 to disengage the clutch 86 which disengages the trip dog stopping the rotation of the wire twisting ring 38. Thus the trip lever 67 is disengaged allowing the cross conveyor bell housing 68 to drive the cross conveyor auger 14 permitting resumption of the feeding of material to the bale forming chamber.

In the operation of the present hay baler the machine is arranged to traverse a field of hay or straw which has been previously cut and windrowed and the pickup 12 of the present machine picks up the hay from the windrow and turns it upwardly and rearwardly into the scope of the cross conveyor auger 14 which lies directly over the platform 13. The hay and straw is thereupon fed laterally of the platform 13 by the auger 14 and against the vertical back wall 15 of the platform. The hay and straw is then fed toward the elongated bale-forming chamber 16 to the side opening 23 thereof. The hay is further guided through the opening 23 by the upwardly curved sheet member 25 directly over the opening which confines the hay and straw over the platform 13 and forwardly of the back wall 15 of the platform. When the hay leaves the open unjournalled end 24 of the auger 14 it is delivered directly into the bale-forming chamber 16 and at that point the hay is received by the bale compressing means which in this invention is the auger conveyor member 26 disposed longitudinally within the elongated bale-forming chamber 16.

The compressor auger 26 is adapted to screw and simultaneously press the material fed laterally into its side thereof longitudinally rearwardly toward the discharge end of the bale-forming chamber.

As previously explained the drive for the baling machine mechanisms as shown is obtained from the power take-off of a pulling tractor, but in lieu of this the various elements of the baler may be driven by an auxiliary engine mounted on the baler. However, the particular means of driving the hay baler is not relevant to the present invention. As best shown in Figures 1 and 2 drive is delivered to the propeller shaft 35 through the universal joint 36 and thereupon to a clutch mechanism 86 which is adapted to directly drive the enlarged sprocket or gear member 37. Operation of the clutch 86 is controlled by the mechanism as shown in Figure 2 which includes the metering wheel 45. This metering wheel engages the side of the bale being formed and is rotated thereby. When a length of the compressed material in the bale chamber rotates the metering wheel 45 a full revolution it causes a trip mechanism to actuate thus permitting the clutch 86 to come into operation and effect a driving of the gear 37 which engages the wire twisting ring 38 and causes it to rotate and effect a tying or twisting of the plurality of wire strands which encircle the bale being formed. Simultaneously the same bale metering mechanism controls the disengagement of the drive to the transversely feeding auger 14 on the platform 13 when the tying cycle comes into operation. Thus there is in fact a cleaning out of the compressing auger 26 by reason of the lack of further material being fed therethrough during the time the encircling wires are intertwisted and a tie made therein.

As the wire twisting mechanism begins operation the plurality of bale encircling wires passing through the wire guide sheaves 109, 110, 111 and 112 are intertwisted by the rotation of the wire twisting ring 38 causing the wires to be twisted at their center at 117. As shown in Figure 6 there are two such intertwisted portions 117 which will be further defined as 117a and 117b. The wire twist 117a constitutes the end against which the baled material is to be compressed and the aligned spaced apart twist 117b constitutes the enclosing wire twist or completed end of the bale previously having a wire twist 117a in the forward end thereof. Figure 6 shows a bale 130 which has now been completed and which has at its forward or discharge end the wire twist 117a and at its opposing or rearward end the wire twist 117b which is still a part of the adjacent and aligned wire twist 117a of a succeeding bale 131 to be formed. As shown diagrammatically in Figure 6 the wires extending radially outwardly from the spaced-apart aligned intertwist 117a and 117b are being carried annularly around by the wire twisting hooks 102, 103, 104 and 105. As previously explained, the rotation of the wire twisting means 38 is continued until the star wheel 92 makes one revolution. Thus the number of points on the star wheel controls the number of twists in the twist 117. The star wheel is indexed one point for each revolution of the wire twisting ring 38. When the star wheel completes its full revolution the wire shear trip mechanism 100 is permitted to drop by reason of the spring 97 pulling it downwardly and thus during this last revolution of the wire twisting ring the wire shears 101 are moved radially inwardly cutting the wires in the manner indicated in Figures 3 and 6. As the intertwisted wires are carried around by the wire twister hooks the wire shears sever the wires on the side adjacent the twist 117b thus leaving the twist 117a with outwardly and thence inwardly extending end portions which constitute the portions previously gripped by the hooks 102, 103, 104 and 105. However, both intertwisted portions 117a and 117b have relatively long tail portions thus minimizing the possibility of an untwisting thereof and thus providing for greater bale stability. Simultaneously with the effecting of the shearing of the several intertwisted wires the entire bale mechanism contributing to the wire twisting at the completion of the formation of the bale is terminated by the disengagement of the clutch 86 thus ceasing rotation of the enlarged sprocket type gear 37 which causes the rotational drive of the wire twisting ring 38. Similarly, immediately after the termination of the rotation of the wire twister ring 38 there is also a resumption of drive of the cross conveyor auger 14 whereupon resumption of baling is commenced. Hay and/or straw is again fed into the bale chamber 16 so that the elongated bale chamber 16 and the compressing auger 26 therein may receive material and cause it to be compressed in the formation of a succeeding bale which itself will be eventually tied when the metering wheel signals to the accompanying mechanism that the bale has successfully completed a certain length whereupon the cross conveyor will again be halted and the tying cycle instigated causing an intertwisting of the surrounding strands of wire. When the strands of wire encircling the bale have been intertwisted at both ends of the bale, the bale is ready for discharge from the bale-forming chamber 16 and it merely drops out the open rear end thereof. The auger 26 must of necessity have its outer periphery circular and thus the portion of the bale forming chamber 16 housing the auger must also be correspondingly circular. However, the rearward discharge portion 132 of the bale chamber 16 is preferably shaped rectangularly whereby the bale after preliminary compression is extruded through a rectangular tube causing the bales to assume that rectangular shape. Rectangularly shaped bales have certain desirable characteristics over circular bales such as for handling and/or for storage.

Numerous details of construction may be varied throughout a wide range without departing from the principles disclosed herein and we therefore do not propose limiting the patent granted hereon otherwise than as necessitated by the appended claims.

What is claimed is:

1. In a baler comprising an elongated bale forming chamber, means delivering material to be baled to said chamber, means within said chamber for compressing material delivered thereto, means supplying bale encircling wires to and around the compressed material, means intertwisting said wires at one end of said compressed material, said last named means including a ring member positioned intermediate the ends of said chamber and transversely of the chamber, said ring member having inwardly projecting wire engaging hooks fixedly mounted thereon, and means for rotating said ring member.

2. A device as set forth in claim 1 in which shear means are mounted on said ring member, and means for causing said shear means to move into proximity with said wire engaging hooks.

3. A device as set forth in claim 1 in which said ring member is equipped with an annular ring of teeth, spaced idler members on said chamber supporting said ring member, and a driving sprocket mounted at the top of said ring member and engaging the annular ring of teeth whereby when the sprocket is driven the ring member is rotated.

4. A device as set forth in claim 3 in which there is provided a source of rotative power, clutch means interposed between the source of rotative power and said sprocket, and means intermittently actuating said clutch means.

5. A device as set forth in claim 4 in which the means intermittently actuating said clutch means includes a bale length metering wheel and linkage movable in response to completion of a revolution of said metering wheel.

6. A device as set forth in claim 5 in which the ring member upon one actuation of the clutch means has means associated therewith for continuing its rotation a predetermined number of revolutions.

7. A baler comprising a generally longitudinally extending bale forming chamber, means delivering material to said bale forming chamber, an auger disposed lengthwise within said bale chamber, said bale forming chamber having an opening therein adjacent said auger and communicating with the means delivering material thereto, means guiding a plurality of wires into said bale forming chamber and around a quantity of material compressed by said auger, and a ring member arranged and constructed to inter-twist said wires at the end of a quantity of compressed material within said bale forming chamber, drive means for said baler elements to be driven, means joining said auger with said drive means for continuous rotation thereof, means joining said platform conveyor with said drive means, clutch means interposed between said drive means and said ring member, and means interposed between said means for driving said conveyor and said clutch means arranged and constructed to operate in response to said clutch means whereby when said clutch means is disengaged said conveyor drive is uninterrupted and when said clutch means is engaged to drive said ring member the conveyor drive is disengaged, said ring member being positioned transversely within said bale-forming chamber at a loation coincident with the terminal ending of said auger, said ring member being mounted for rotation on said bale-forming chamber around the material being compressed by said auger.

8. A device as set forth in claim 7 in which rigid hook members are positioned on said ring member and project radially inwardly at spaced intervals therearound, wire guide sheaves mounted on and spaced around said bale-forming chamber adjacent said ring member, whereby each of said plurality of wires passes over one of said guide sheaves and after passing longitudinally around the compressed bale of material the wires are intertwisted by rotation of said ring member and the rigid hook members each carrying a wire annularly around the circumference of said bale-forming chamber and effecting an intertwist at substantially the longitudinal axis of the compressed bale.

9. In a baler comprising an elongated bale-forming chamber, auger means within one end of said chamber for compressing material to be baled within said bale-forming chamber, said bale-forming chamber having an annular opening adjacent the end of said auger means, a rotating ring member journally mounted transversely in said bale-forming chamber within said annular opening, hook means mounted internally of said ring member, means guiding a plurality of wires through said annular opening, said hook means intertwisting the ends of said wires by the rotation of said ring member, means feeding material to be baled to said bale-forming chamber adjacent said auger means, means rotating said auger means and compressing said material to be baled against said intertwisted wires, means responsive to the length of material to be baled to effect a second intertwisting of said wires at the other end of said bale by rotating said ring member, said ring member gripping each of said wires and carrying them circumferentially around the bale-forming chamber causing a twist at the end of the completed bale and simultaneously a spaced-apart twist to constitute the forward end of a succeeding bale to be formed.

10. A device as set forth in claim 9 in which shear means are hingedly mounted on said rotating ring member, and whereby in one position of said shear means the wires are each severed adjacent the hook means between the spaced twists at the center thereof as the ring member rotates.

11. A device as set forth in claim 9 in which drive means is provided for said ring member, a clutch interposed between said ring member and said drive means, said clutch actuated for engagement by said means responsive to the length of material to be baled, means controlling the number of twisting revolutions the ring member is to make, said last named means including a star wheel having a plurality of projections extending generally radially outwardly, means on said ring member for effecting an indexing rotation of said star wheel over projections for each full revolution of said ring member, and a trip finger rotatable with said star wheel causing disengagement of said clutch after the star wheel has been indexed a full revolution.

12. A device as set forth in claim 11 in which shear means are hingedly mounted on said rotating ring member for movement between two positions, a shear trip member mounted on said bale-forming chamber and arranged and constructed during the last indexing movement of said star wheel for moving said shear means into wire shearing position.

13. A device as set forth in claim 12 in which spring retained means are mounted on said rotating ring member to cause movement of said shear means to an inoperative or non-wire shearing position after the wires are severed.

References Cited in the file of this patent

UNITED STATES PATENTS

| 2,030,031 | Innes | Feb. 4, 1936 |
| 2,080,316 | Innes | May 11, 1937 |
| 2,179,937 | Lamp | Nov. 14, 1939 |
| 2,696,777 | Sutch | Dec. 14, 1954 |

FOREIGN PATENTS

| 11,622 | Great Britain | May 18, 1906 |